(12) United States Patent
Strutt

(10) Patent No.: US 7,653,004 B2
(45) Date of Patent: Jan. 26, 2010

(54) METHOD AND SYSTEM FOR IMPROVING TIME OF ARRIVAL (TOA) MEASUREMENTS IN A WIRELESS COMMUNICATION NETWORK

(75) Inventor: Guenael J. Strutt, Sanford, FL (US)

(73) Assignee: Motorola, Inc., Schaumburg, IL (US)

( * ) Notice: Subject to any disclaimer, the term of this patent is extended or adjusted under 35 U.S.C. 154(b) by 570 days.

(21) Appl. No.: 11/289,809

(22) Filed: Nov. 30, 2005

(65) Prior Publication Data

US 2007/0121679 A1    May 31, 2007

(51) Int. Cl.
| H04J 1/16 | (2006.01) |
| H04J 3/14 | (2006.01) |
| H04J 3/06 | (2006.01) |
| H04W 24/00 | (2009.01) |
| H02H 1/00 | (2006.01) |
| G01S 1/00 | (2006.01) |

(52) U.S. Cl. .............. 370/252; 370/253; 370/516; 455/456.1; 342/357.12; 361/119

(58) Field of Classification Search .......... 370/516, 370/517, 518, 519; 455/456.1, 456.2, 456.6
See application file for complete search history.

(56) References Cited

U.S. PATENT DOCUMENTS

| 4,584,584 A |  | 4/1986 | Kliger | |
| 5,414,729 A |  | 5/1995 | Fenton | |
| 5,764,686 A | * | 6/1998 | Sanderford et al. | 375/149 |
| 5,825,324 A |  | 10/1998 | Julian | |
| 5,999,131 A |  | 12/1999 | Sullivan | |
| 6,009,334 A | * | 12/1999 | Grubeck et al. | 455/456.2 |
| 6,453,168 B1 | * | 9/2002 | McCrady et al. | 455/517 |
| 6,469,665 B2 | * | 10/2002 | Porcino | 342/387 |
| 6,711,123 B1 | * | 3/2004 | Taira | 370/208 |
| 6,756,940 B2 | * | 6/2004 | Oh et al. | 342/387 |
| 6,871,077 B2 | * | 3/2005 | Kennedy, Jr. | 455/456.5 |
| 6,888,497 B2 | * | 5/2005 | King et al. | 342/357.12 |
| 7,030,811 B2 | * | 4/2006 | Goren et al. | 342/387 |
| 7,054,126 B2 | * | 5/2006 | Strutt et al. | 361/119 |
| 2001/0038674 A1 |  | 11/2001 | Trans | |
| 2003/0227895 A1 |  | 12/2003 | Strutt et al. | |
| 2004/0018845 A1 |  | 1/2004 | Kroll | |
| 2005/0063383 A1 |  | 3/2005 | Wisler | |

FOREIGN PATENT DOCUMENTS

GB         2191649       * 12/1987

OTHER PUBLICATIONS

PCT International Search Report Dated Nov. 6, 2007—7 Pages.

* cited by examiner

Primary Examiner—Chi H Pham
Assistant Examiner—Farah Faroul
(74) Attorney, Agent, or Firm—Barbara R. Doutre

(57) ABSTRACT

A technique for improving the capability of measuring the distance between nodes of a wireless communication network is provided. Technique (800) includes receiving a measured signal, correlating the measured signal with a reference signal to output a measured correlated function, comparing the correlation function to a predetermined reference correlation function, the reference correlation function being based on a predetermined direct path sequence and an estimation of the phase delay of the measured correlated function. A score is assigned to the measured correlation function based on how close the measured correlation function resembles the predetermined reference correlation function. Technique (800) provides improved location accuracy, even in multipath environments, by indicating the quality of the TOA measurement and enabling the selection of a correction mechanism.

7 Claims, 5 Drawing Sheets

QUADRATIC APPROXIMATION

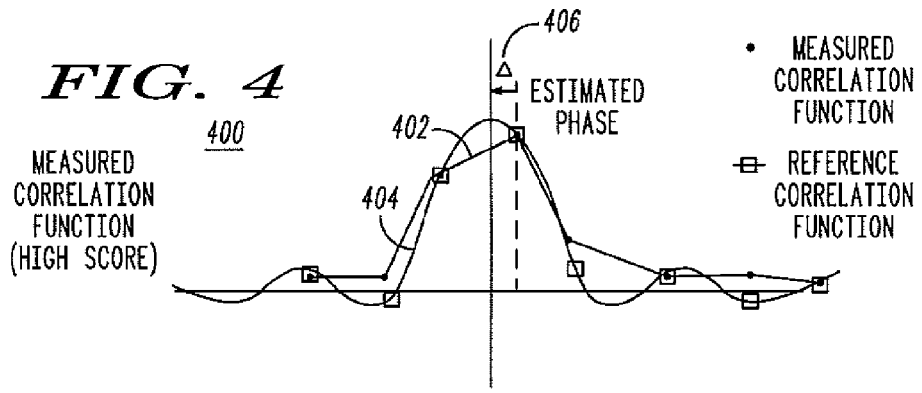
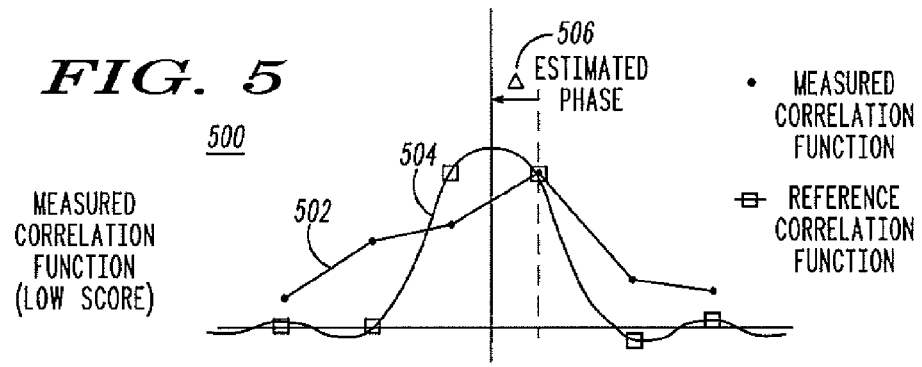
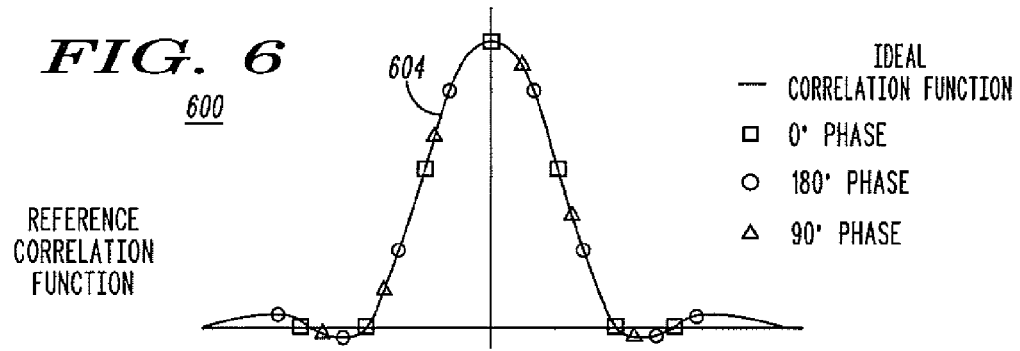
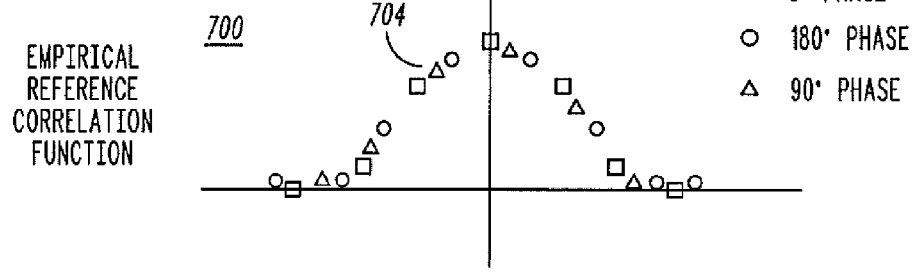

METHOD AND SYSTEM FOR IMPROVING TIME OF ARRIVAL (TOA) MEASUREMENTS IN A WIRELESS COMMUNICATION NETWORK

TECHNICAL FIELD

This invention relates in general to wireless networks and more particularly to improving Time of Arrival (TOA) measurements between nodes of a wireless communications network.

BACKGROUND

Wireless communication networks have become increasingly prevalent over the past decade. In recent years, a type of mobile communication network known as an "ad-hoc" network has been developed. In this type of network, a mobile node is capable of operating as a base station or router for other mobile nodes without using fixed infrastructure base stations. More sophisticated ad-hoc networks are also being developed which, in addition to enabling mobile nodes to communicate with each other as in conventional ad-hoc networks, further enable the mobile nodes to access a fixed network and thus communicate with other mobile nodes, such as those of a switched telephone network (PSTN), and on other networks such as the Internet. The mobile nodes of such networks may assume any number of random positions within the network, making exact node location determinations difficult when needed. For computing node geographical coordinates in such ad-hoc wireless networks, algorithms in use at individual nodes in typical networks use a "Time of Arrival" (TOA) measurement technique.

A Time of Arrival (TOA) measurement provides the distance between mobile nodes for computing a mobile node position. The measurements are based upon signal propagation times, specifically the time a signal needs for traveling between transceivers of a target node and a reference node. Historically, TOA measurements provide an estimate of the distance between two transceivers, or nodes, using approaches that assume that any information received is via a direct path channel. Existing TOA measurement methods detect a peak of a correlation function of a received signal. This peak, however, could be the manifestation of the direct path only or the direct path "tainted" with delay spread. TOA measurements can thus be inaccurate due to delay spread and multipath in the communication channel. Furthermore, existing methods typically average TOA measurements to determine distance which can lead to a trade off between convergence and accuracy.

Accordingly, it would be beneficial to have an improved method of determining the distance between nodes of a wireless communications network that would address the delay spread and multipath problem.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

FIG. 4 is an example of a graph representing a measured correlation function having a high score in accordance with the present invention;

FIG. 5 is an example of a graph representing a measured correlation function having a low score in accordance with the present invention;

FIG. 6 is an example of a reference correlation function for use in the method and apparatus of the present invention;

FIG. 7 is a graph of an empirical reference correlation function in accordance with an embodiment of the present invention.

DETAILED DESCRIPTION OF THE PREFERRED EMBODIMENT

Figure 1:
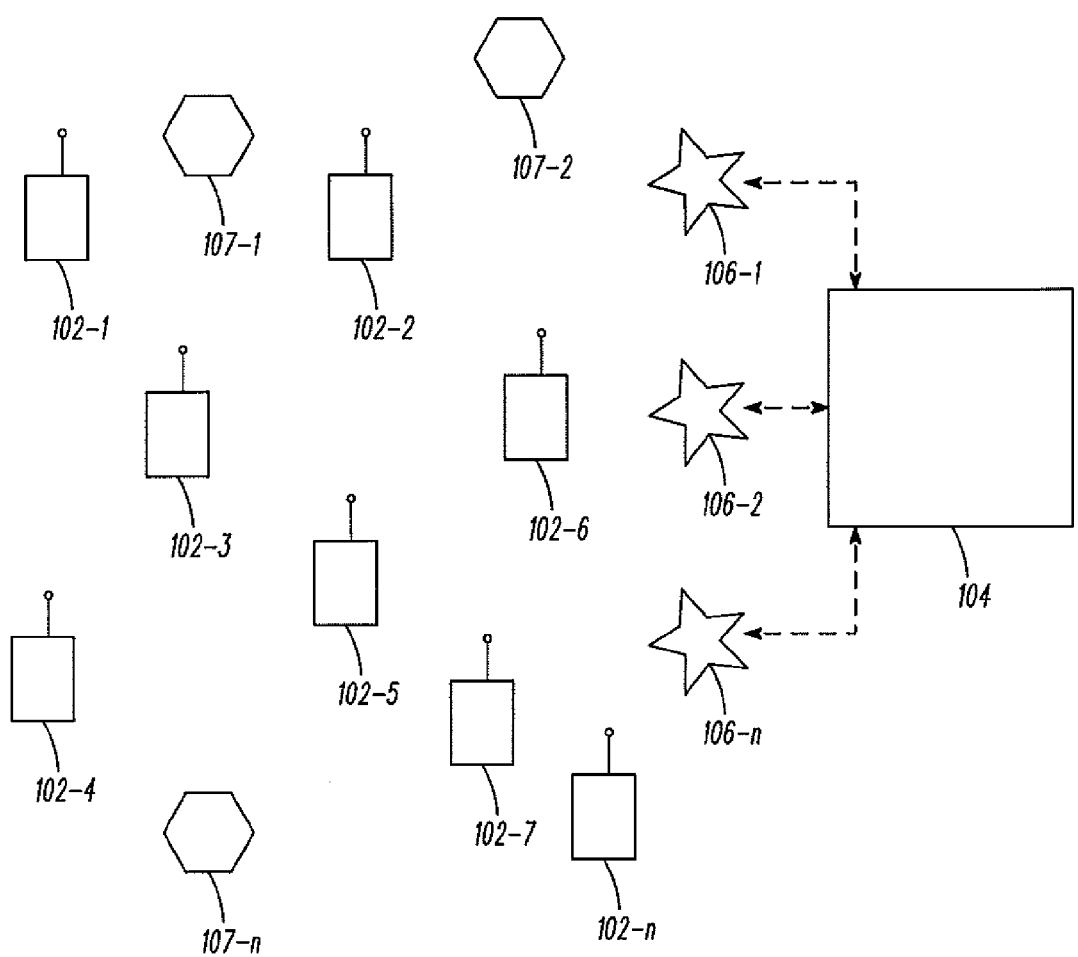
FIG. 1 is a block diagram of an example ad-hoc wireless communications network including a plurality of nodes employing a system and method in accordance with an embodiment of the present invention.

While the specification concludes with claims defining the features of the invention that are regarded as novel, it is believed that the invention will be better understood from a consideration of the following description in conjunction with the drawing figures, in which like reference numerals are carried forward.

The present invention may be embodied in several forms and manners. The description provided below and the drawings show exemplary embodiments of the invention. Those of skill in the art will appreciate that the invention may be embodied in other forms and manners not shown below. The invention shall have the full scope of the claims and shall not be limited by the embodiments shown below. It is further understood that the use of relational terms, if any, such as first, second, top and bottom, front and rear and the like are used solely for distinguishing one entity or action from another, without necessarily requiring or implying any such actual relationship or order between such entities or actions.

FIG. 1 is a block diagram illustrating an example of an ad-hoc wireless communications network 100 employing an embodiment of the present invention. Specifically, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, . . . 106-n (referred to generally as nodes 106, access points (APs) 106 or intelligent access points (IAPs) 106), for providing nodes 102 with access to the fixed network 104. The fixed network 104 can include, for example, a core local area network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107, wireless routers (WRs) 107 or fixed routers 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. No. 7,072,650, granted on Jul. 4, 2006 and U.S. Pat. Nos. 6,807,165 and 6,873,839.

Figure 2:
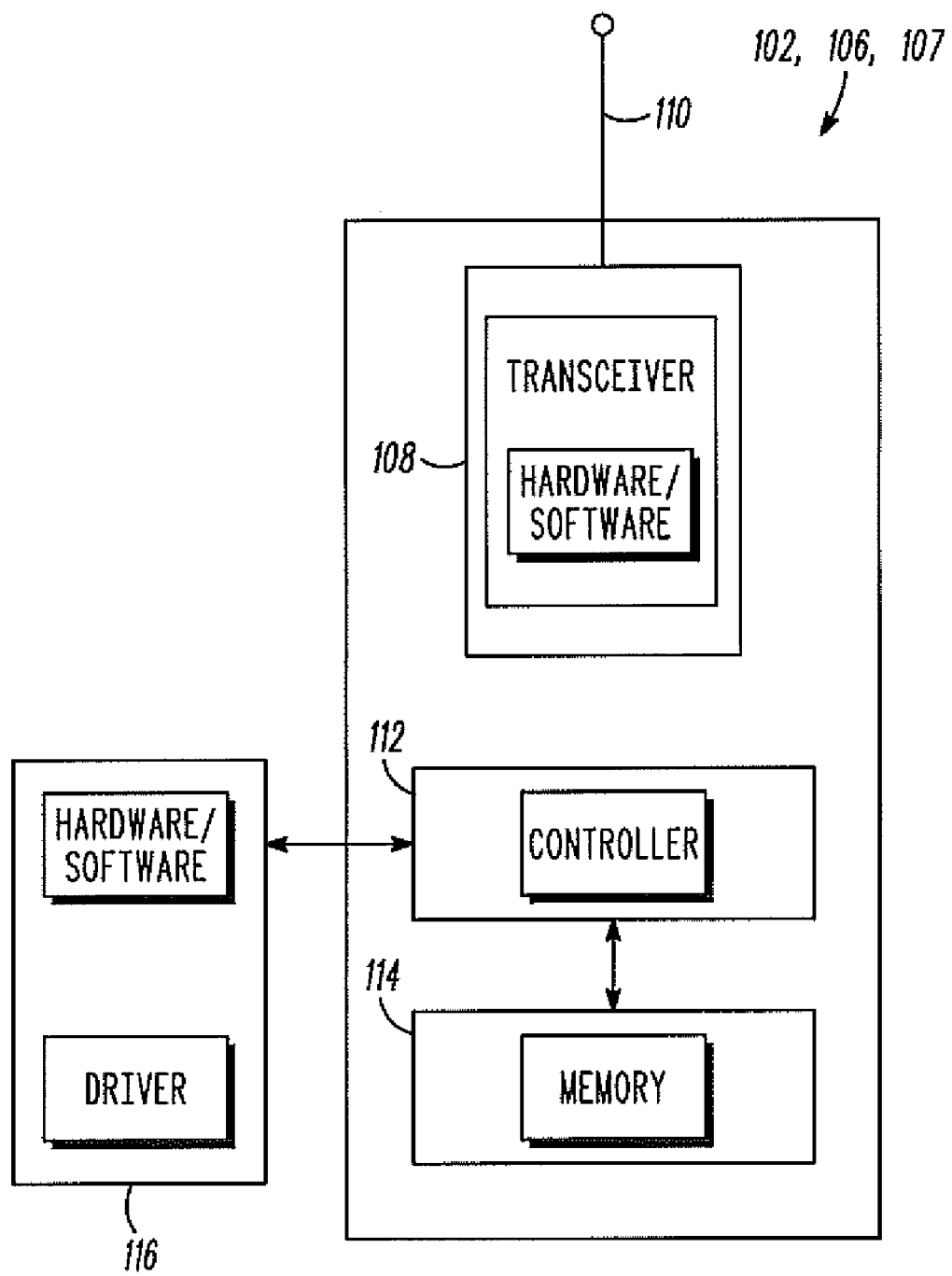
FIG. 2 is a block diagram illustrating an example of a mobile node employed in the network shown in FIG. 1.

As shown in FIG. 2, each node 102, 106 and 107 includes at least one transceiver or modem 108, which is coupled to an antenna 110 and is capable of receiving and transmitting signals, such as packetized signals, to and from the nodes 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included. Additionally, each node includes the appropriate hardware and software to perform Time of Arrival (TOA) measurements, as set forth in greater detail below.

As stated earlier, mobile nodes 102 of such networks may assume any number of random positions within the network, making exact node location determinations difficult when needed. In order for nodes 102, 106 and 107 to ascertain each others locations, a Time of Arrival (TOA) measurement can be used to provide an estimate of the distance between the two transceivers of a first and a second node. In order to perform high precision computations for mobile node location services, it is necessary to measure the distance between the two transceivers with a high degree of precision. Determining distance measurements in a multipath channel is particularly challenging, because it is sometimes impossible to extract the direct path information out of a received signal. If a direct path is weaker than the secondary paths, it is possible that the receiver will detect some of the secondary paths, but not the direct path. If the secondary paths are close in time to the direct path, the mechanism that determines the time of the direct path will be confused by the presence of secondary paths and consequently may not have enough resolution to distinguish between both. A small error in time calculation results in large errors in the determination of position.

Briefly, in accordance with the present invention, direct path data is extracted from available channel information in order to determine whether a strong direct path is present. To accomplish this task, correlation functions of a received signal are measured and reference correlation functions are generated. To address the multi-path issue, a score is assigned based on similarities between the measured correlation function and the reference correlation function. The assigned score provides an indication of how close the measured correlation function is to a direct path function. The measured correlation function with the highest score is then used to improve the TOA measurement of the received signal.

Referring back to FIG. 1, node 102 can be said to be operating as a ranger and node 104 can be said to be operating as a pinger. The ranger 102 is the node that sends a first ranging packet and the pinger 104 is the node that replies to the ranging packet with another ranging packet. In operation, ranger node 102 sends a ranging message to pinger node 104 to instigate time of arrival (TOA) measurements of received signals. Thus, when pinger node 104 receives a signal from node 102 over a communication channel, a TOA measurement of the received signal is taken.

In accordance with the present invention, a received signal is correlated with a reference signal to obtain a measured correlation function. Examples of graphical representations of measured correlation functions are shown in FIGS. 4 and 5. Graph 400 includes measured correlation function 402 and reference correlation function 404. The estimated phase delay is represented by designator 406. Graph 500 includes measured correlation function 502 and reference correlation function 404. The estimated phase delay is represented by designator 506. Phase delay is calculated with using the following formula:

$$\Delta = \frac{1}{2} \cdot \frac{Z_- - Z_+}{2Z_0 - Z_+ - Z_-}$$

Figure 3:
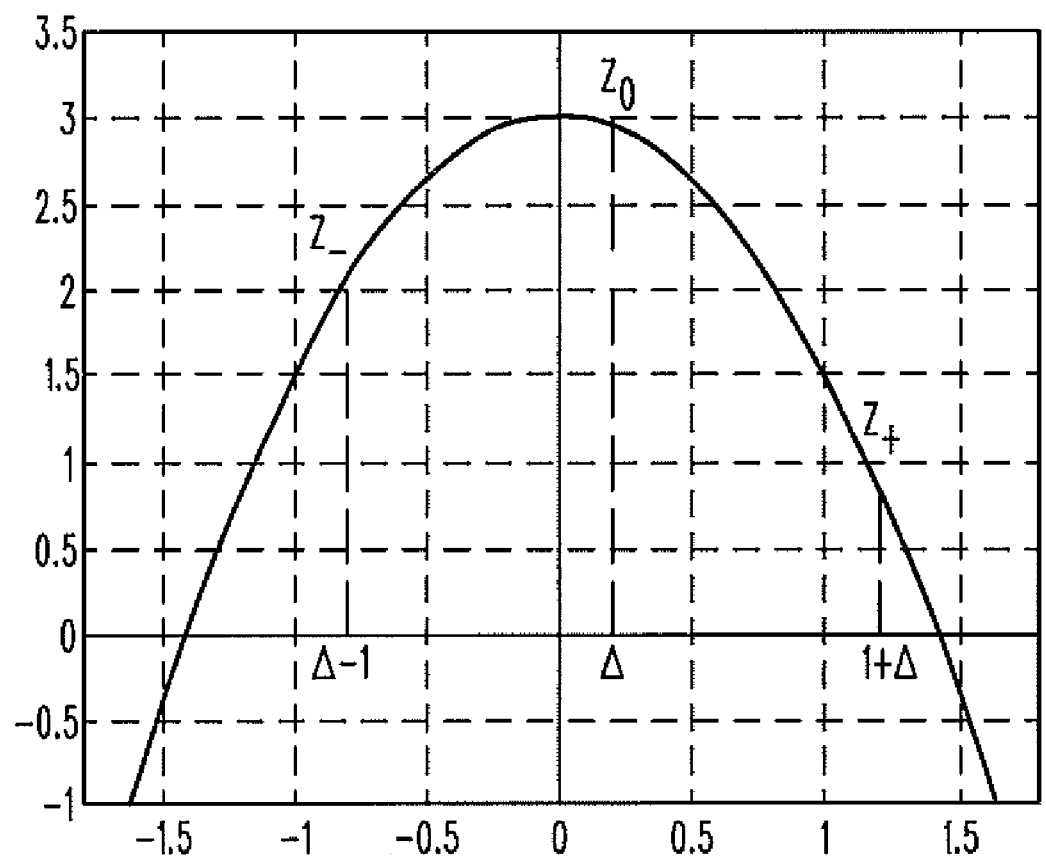
FIG. 3 is an example of a graph of a quadratic approximation for estimating phase delay for use in the method and apparatus of the present invention.

The phase delay ($\Delta$) is the correction applied to the measured TOA of the received signal. The values of $Z_0$, $Z_+$ and $Z_-$ are measured as shown in the quadratic approximation of FIG. 3. Graph 300 shows amplitude versus phase delay, expressed in multiples of the sampling interval.

FIG. 6 shows a reference correlation function 604. The reference correlation function 604 is constructed based on the amplitude and the phase delay of the measured correlation function. The reference correlation function 604 can be determined analytically as shown in FIG. 6 or empirically as graphically represented in FIG. 7 by graph 700. A reference correlation function is constructed for each measured correlation function, and thus the reference correlation function will vary from measurement to measurement thereby providing a dynamic reference correlation function. Hence, the reference correlation function 404 of FIG. 4 and the reference correlation function 504 of FIG. 5 do not have the same amplitude and are not sampled using the same phase delay.

In accordance with the present invention, the score is calculated based on similarities between the reference correlation function and the measured correlation function. The calculated score is proportional to the inverted sum of the difference between the reference correlation function and the measured correlation function. The calculated score is used as an estimation of signal quality in a communication channel.

As seen from the graphs 400, 500, the estimated phase delay ($\Delta$) is smaller in graph 400 and a higher score will be assigned and the estimated phase delay 506 will have a lower score assigned. Based on the assigned score, multipath is determined for the measured correlation function 402 and a TOA measurement is adjusted using the estimated phase delay 406. The low score measured correlation function 502 will be considered multipath and alternate TOA techniques can be used.

The scoring information may be used to: apply the $\Delta$ correction to the TOA to obtain an accurate measure; provide a weight to the location service calculation; apply specific smoothing filter to the TOA samples; and/or apply a specific elimination criteria for TOA samples. Thus, the position of a node in a network can now be determined utilizing a TOA having a higher degree of precision.

Additionally, an error can be determined, the error being proportional to the difference between measurement and theory, as well as to the amplitude of the measurement, or the reference (whichever is greatest). The determined error represents mostly those errors that are measured at high amplitudes, which are most representative of what the input signal looks like, rather than low amplitudes, which are mostly driven by noise. The error can be biased by taking the difference between the reference correlation function and the measured correlation function and multiplying the difference by a power of the amplitude of the highest reference correlation function and the measured correlation function. The error is thus biased toward large amplitude discrepancies which do not have correlation noise.

Figure 8:
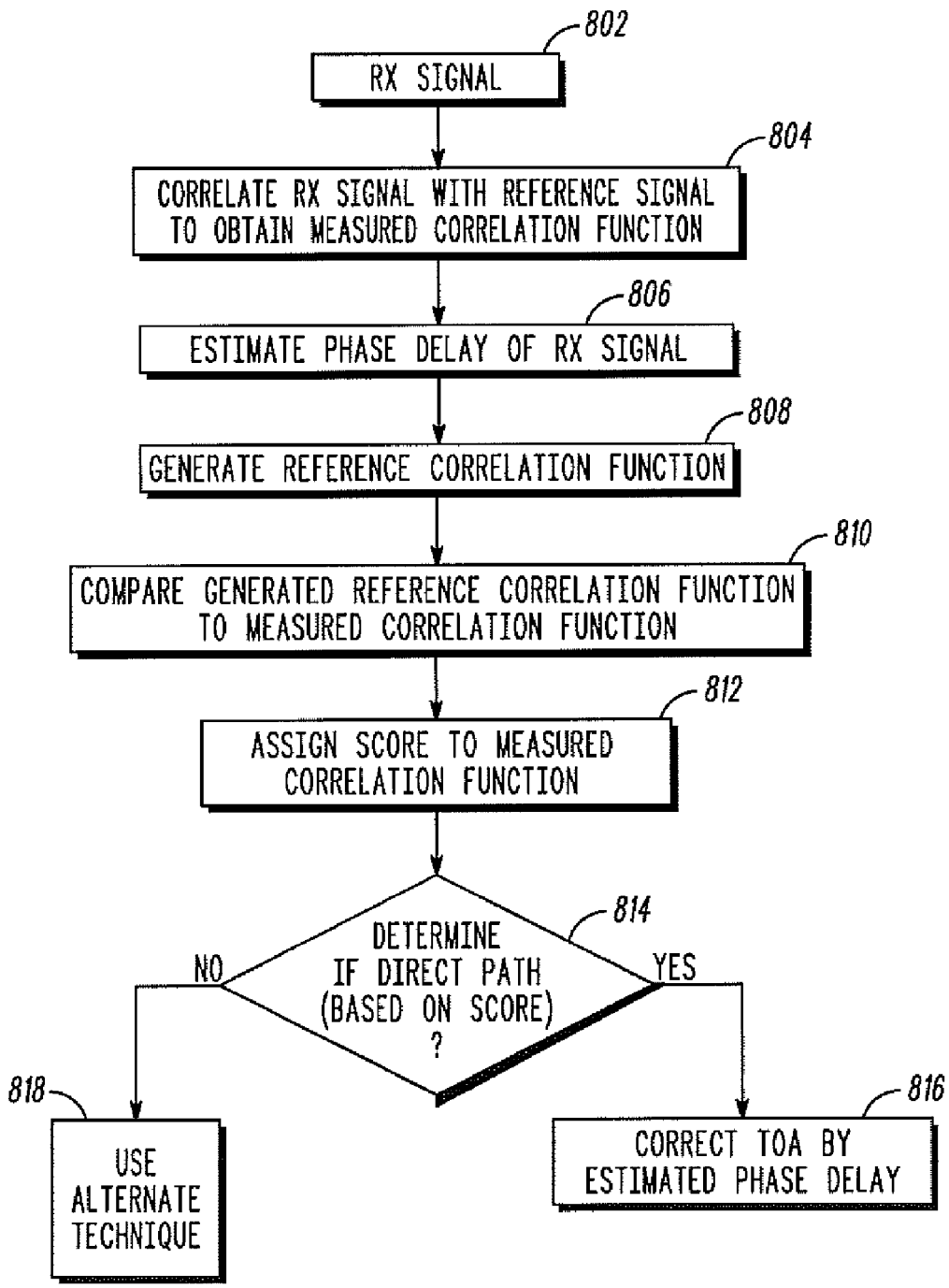
FIG. 8 is a flowchart summarizing the steps for estimating time of arrival (TOA) in accordance with the present invention.

Referring now to FIG. 8, there is shown a flowchart 800 summarizing the steps for improving TOA measurements utilizing the scoring of correlation functions in accordance with the present invention. Beginning at step 802 a signal is received (either at the ranger or pinger) and correlated with a reference signal at step 804 to obtain a measured correlation function (such as 402 or 502 of graphs FIG. 4 and 5). The phase delay of the received signal is estimated at step 806 utilizing the measured correlation function (such as 406/506 of graphs FIG. 4 and 5). A reference correlation function is generated at step 808 (reference correlation function 404, 504, 604 and 704 are equivalent) based on the amplitude and the delay of the measured correlation function. The measured correlation function is compared to the reference correlation function at step 810 (graph of FIG. 6). A score is calculated at step 812 and assigned based on how close the measured correlation function is to reference correlation function. The higher the score, the more likely a direct path was encountered. If the score indicates a direct path at step 814, then the step of correcting the TOA by the estimated phase delay takes place at step 816. If the score is low, indicating multipath, alternate TOA techniques can be used.

Technique can further comprise the step of biasing an error of the measured correlation function by taking the difference between the reference correlation function and the measured correlation function and multiplying the difference by a power of the amplitude of the highest reference correlation function and the measured correlation function. The error is thus biased toward large amplitude discrepancies which do not have correlation noise.

The technique of scoring a correlation function output in accordance with the present invention is thus able to determine whether a path is "tainted" or not. The technique of scoring a correlation function in accordance with the present invention provides the ability to detect single path correlation even if received signal strength (RSS) is low. The score represents the likelihood of the peak being a single path. Multiple paths will compress the peak or widen it, depending on how far apart the paths are. The score is used for various purposes including interpolating the samples to increase precision, eliminating imprecise data points and estimating the quality of the communication channel. The technique of the present invention interpolates the reference function based on the estimation of the phase of the input function. The method of scoring allows for fast convergence when the scores are high and allows for a fall-back on alternate distance estimation methods if the channel is poor.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of estimating time of arrival (TOA) in an ad-hoc communications network, comprising the steps of:
   sending a ranging message from a first node to a second node;
   receiving a signal at the second node;
   measuring the TOA of the received signal;
   correlating the received signal with a reference signal to obtain a measured correlation function;
   estimating a phase delay of the received signal utilizing the measured correlation function;
   constructing a reference correlation function based on the amplitude and the phase delay of the measured correlation function;
   calculating a score indicating quality of the measured TOA, based on the reference correlation function and the measured correlation function, wherein the calculated score is proportional to the inverted sum of the difference between the reference correlation function and the measured correlation function; and
   biasing an error by taking the difference between the reference correlation function and the measured correlation function and multiplying the difference by a power of the amplitude of the highest reference correlation function and the measured correlation function.

2. The method of claim 1, further comprising the steps of:
   comparing the calculated score to a predetermined score threshold; and
   when the score is greater than the predetermined score threshold, then:
   correcting the measured TOA according to the estimated phase delay;
   when the score does not meet the predetermined score threshold, then:
   assuming that the received signal contains multipath.

3. The method of claim 1, wherein the reference correlation function is determined empirically.

4. The method of claim 1, wherein the reference correlation function is determined analytically.

5. The method of claim 1, wherein the calculated score is used as an estimation of signal quality in a communication channel.

6. A method for improving the capability of measuring the distance between nodes of a wireless communication network, comprising the steps of:
   receiving a signal at a node;
   measuring TOA of the received signal;
   correlating the received signal with a reference signal to output a measured correlation function;
   comparing the measured correlation function to a reference correlation function, the reference correlation function being based on a predetermined direct path sequence and an estimation of the phase delay of the measured correlated function;
   assigning a score to the measured correlation function wherein the assigned score is proportional to the inverted sum of the difference between the reference correlation function and the measured correlation function;
   indicating the quality of the TOA measurement based on the assigned score; and
   enabling the selection of a correction mechanism for the measured received signal based on the quality.

7. The method of claim 6, further comprising the steps of:
   comparing the assigned score to a predetermined score threshold; and
   when the score is greater than the predetermined score threshold, then:
   correcting the measured TOA according to the estimated phase delay;
   when the score does not meet the predetermined score threshold, then:
   assuming that the received signal contains multipath.

* * * * *